United States Patent [19]

Kelly

[11] 4,450,057

[45] May 22, 1984

[54] PROCESS FOR REMOVING ALUMINUM AND SILICA FROM ALKALI METAL HALIDE BRINE SOLUTIONS

[75] Inventor: Pilar P. Kelly, Knoxville, Tenn.

[73] Assignee: OLIN Corporation, New Haven, Conn.

[21] Appl. No.: 552,958

[22] Filed: Nov. 18, 1983

[51] Int. Cl.³ .................. C25B 1/16; C25B 1/26
[52] U.S. Cl. .................. 204/98; 210/662; 210/670; 210/681; 423/179; 423/499; 204/128
[58] Field of Search .............. 204/98, 128; 210/662, 210/670, 681; 423/179, 499

[56] References Cited

U.S. PATENT DOCUMENTS

| | | | |
|---|---|---|---|
| 3,616,328 | 10/1971 | Currey et al. ............. | 204/98 |
| 4,073,706 | 2/1978 | Nagy ....................... | 204/98 |
| 4,078,978 | 3/1978 | Zirngiebl ................. | 204/98 |
| 4,119,508 | 10/1978 | Yokota et al. ............ | 204/128 |
| 4,155,820 | 5/1979 | Ogawa et al. ............. | 204/98 |
| 4,176,022 | 11/1979 | Darlington ............... | 204/98 |
| 4,207,152 | 6/1980 | Kadija et al. ............ | 204/98 |
| 4,242,185 | 12/1980 | McRae ..................... | 204/98 |
| 4,261,803 | 4/1981 | Suhara et al. ............ | 204/98 |
| 4,274,929 | 6/1981 | Novak ..................... | 204/98 |
| 4,417,961 | 11/1983 | Ezzell et al. ............ | 204/98 |

*Primary Examiner*—R. L. Andrews
*Assistant Examiner*—Terryence Chapman
*Attorney, Agent, or Firm*—Arthur E. Oaks; Donald F. Clements

[57] ABSTRACT

A process for removing dissolved aluminum and silica contaminants from concentrated alkali metal halide brines used in membrane electrolytic cells is disclosed. The process involves contacting an acidified brine at a pH of between about 2.0 and about 3.0 with a strong macroreticular cationic chelating resin.

14 Claims, No Drawings

PROCESS FOR REMOVING ALUMINUM AND SILICA FROM ALKALI METAL HALIDE BRINE SOLUTIONS

FIELD OF THE INVENTION

This invention relates to a process for removing aluminum and silica from concentrated alkali metal halide brine solutions used in membrane electrolytic cells.

BACKGROUND OF THE INVENTION

Efficient operation of modern chlor-alkali membrane cells requires that many contaminants in the anolyte brine be removed or neutralized before electrolysis starts. Early in the development of these cells, it was identified that concentrations of alkaline earth metals, such as calcium and magnesium, in the brine should be held to levels below about 50 parts per billion (ppb) and preferably below about 10 ppb to achieve long-term, high efficiency operation. Where the brine used is derived from a reconstituted depicted brine anolyte, other brine contaminants found to negatively affect cell performance are sulfates, chlorates and hypochlorites which plug or otherwise degrade the membrane during electrolysis.

Normally, treatment to remove these contaminants comprises admixing the reconstituted brine first with alkali metal carbonate to precipitate dissolved calcium and then with an alkali metal hydroxide to precipitate the magnesium. Where present, excess sulfate ions can be removed by adding barium chloride thereto or by purging part of the brine stream. Occasionally, flocculants, such as aluminum or ferric chloride, are added to reduce the settling time required to remove these precipitates. Such a process can produce the saturated brines having residual impurity contents as shown in Table I:

TABLE I

| Impurity | Level |
|---|---|
| Calcium (ppm) | 1 |
| Magnesium (ppm) | 0.1 |
| Sulfate (gpl) | 10 |
| Fe (ppm) | 0.1 | at a pH of about 11. Such a pH value is generally too high for membrane cell use, so a mineral acid, usually the halide acid, is added to lower the pH value, preferably to between about 2 and about 4. Further, by so doing, any excess carbonate present is removed along with any residual hypohalite or halate ions remaining after dechlorination.

While such brines are suitable for use in mercury and diaphragm cells, the calcium and magnesium values, in particular, are still too high for use in many cells using high performance permselective cationic membranes. For such use, an additional treatment in which the brine at a pH of about 8.0 is admixed with an ion exchange resin to effectively lower the calcium and magnesium values to levels approaching 10 ppb (0.010 ppm) is applied. Techniques for performing these operations are well known in the art.

Reconstituted brine also contains a small amount of aluminum, both in ionic and colloidal form, which is normally present at a level of between about 0.1 and about 2.5 parts per million (ppm), and silica, which is normally present at a level of between about 0.1 and about 20 ppm. Most recently, it has been found that these impurities also have a capability to damage the membrane and significantly affect its sodium and water transport properties. Further, when present at the same time, aluminum and silica, at a pH above about 3.5, form a stable, nonionic colloidal complex which proves to be quite difficult to remove. While techniques, such as ultrafiltration, have some utility for removing uncomplexed silica, it is found that they are not particularly effective in either breaking the complex or removing the aluminum.

What is needed is a technique for breaking this complex and converting the aluminum and silica therein to forms in which they may be effectively and efficiently removed from said brine.

OBJECTS OF THE INVENTION

It is the object of this present invention to provide an efficient process for selectively removing dissolved ionic aluminum and silica from alkali metal halide brines used in electrolytic chlor-alkali cells.

It is a further object of the present invention to provide a process for selectively removing dissolved ionic aluminum and silica from purified concentrated sodium chloride brines.

It is still another object of the present invention to provide a process for providing a brine for use in a membrane cell having substantially reduced levels of aluminum and silica so that membrane performance is not degraded.

These and other objects of this invention will become apparent from the following description and the appended claims.

SUMMARY OF THE INVENTION

According to the present invention, a process is provided for the removal of aluminum and silica from an alkali metal halide brine anolyte for an electrolytic cell, said process comprising:

(a) adjusting the pH of said brine to between about 2.0 and about 3.0;

(b) contacting said brine with a strong macroreticular cationic chelating resin to remove dissolved aluminum and silica therefrom, said contact causing the pH of said brine to increase and continuing the contacting of said brine with said resin for as long as the pH of the brine or discharge is above about 5.5;

(c) separating said brine from said resin for use in said cell; and (d) readjusting, when necessary, the pH of said separated brine to the proper operating range for said cell.

DETAILED DESCRIPTION OF THE INVENTION

The process of the present invention is an ion exchange chelation procedure for removing dissolved ionic aluminum and silica from alkali metal halide brines. It should be understood that, as used in the following description and claims, the term "alkali metal" is intended to include sodium, potassium, lithium and cesium while the term "halide" is intended to include chlorides and bromides. The use of the terms sodium chloride or "salt" (as a synonym therefore) as the main constituent of the brine are merely exemplary and not definitive.

While the present process can be applied at any stage in the brine treatment process, it is preferably applied to brines which have completed the normal treatment to produce the low overall impurity levels as shown in Table I above. In this process, the aforementioned nonionic colloidal complex of aluminum and silica is first decomposed to form ionic $Al^{+3}$ and $SiO_3^{--}$ in a strongly acidic solution. Such decomposition begins at a pH value below about 3.5 and is more or less complete when the pH range reaches a value of between about 2.0 and about 2.5, said values being reached by the addition of a mineral acid, generally hydrochloric acid, to the brine.

Removal of the ionic aluminum and silica so produced is accomplished by admixing said acidified brine with a strong macroreticular cationic exchange resin. Resins of this type are reported to have a styrene-divinylbenzene backbone with an amino discetic acid as the functional group. Chelating resins satisfactory for this purpose include Amberlite ® IRC-718 as sold by the Rohm and Haas Company, Duocellite ES-467 and Mitsubishi CR-10. Such resins are known to have a substantial capability for removing heavy metals from both acid and basic solutions. In an acid solution, the removal process apparently proceeds by chelation resulting in the displacement of hydroxyl ions at the cation active site by $Al^{+3}$ and $Ca^{+2}$ ions. In so doing, the solution passing therethrough becomes progressively more basic as more of the displaced hydroxyl ions become available to neutralize the acid. In the process of this invention, it has been found that, with fresh resins, pH values as high as 8 or 9 may be reached in the discharged brine solution.

When applied to this manner, it has been found that as long as the discharged brine pH is maintained at a value above about 5.5 and preferably above about 6.0, the efficacy of the resin for removing aluminum from the brine solution with at least some of the calcium is unaffected. When the discharged brine pH value drops to below this value, the selectivity of the resin for $Al^{+3}$ and $Ca^{+2}$ is found to be essentially exhausted and both the aluminum and calcium contents of the discharged solution rise sharply. It is postulated that, at this pH, the acidic brine elutriates the absorbed aluminum and calcium from the resin and releases a relatively concentrated slug of these contaminants back into the brine. A number of conventional systems for monitoring pH are available for use in brine streams so that controlling system performance is straightforward.

Overall operation of the system is in conformance with conventional ion exchange practices. In the process of this invention, no special steps need be taken to heat or cool the brine once it is acidified. Further, various conventional methods of treatment may be utilized. These include simple stirred contact for batchwise operation or packed tower systems for continuous operations, either in fixed bed or fluidized bed modes. In tower operation, it appears to be immaterial whether upflow or downflow is used. For continuous flow operation, the space velocity (bed volumes/hour) of the flow through the resin should be no more than about 35 and preferably no more than about 10. However, it has been shown that where lower values of flow rates are used, stability of the resin is enhanced somewhat and, further, somewhat lower calcium levels are achieved in the discharged brine, thus simplifying any secondary ion exchange processes which might be used to reduce the calcium and magnesium contents even more.

Lastly, the resin is easily regeneratable, first by elutriating the absorbed positive ions with a mineral acid, preferably hydrochloric acid, and then by converting the acidified form of the resin to a basic form with a caustic solution, preferably a sodium hydroxide solution. Techniques for so doing are well known in the art and, once performed, the resin is fully reconditioned for additional use.

The process of the present invention is illustrated in the following examples.

EXAMPLE 1

A 7/16" diameter column was filled with about 20 milliliters (ml) of a strong macroreticular cationic chelating resin (Amberlite ® IRC-718 resin) in sodium form to achieve a bed depth of about 8.5". A saturated brine solution containing 17 ppb calcium, 5.16 ppm aluminum and 11.1 ppm silica at a pH of 2.16 was fed to the column at a space velocity of 30 bed volumes/hour.

The results obtained are shown in Table II, wherein the pH, aluminum, silicon and calcium contents of the discharged brine are shown as a function of the number of bed volumes of solution treated. Note that, when the pH falls below a value of about 5.5, the aluminum content begins to rise quite rapidly and that the calcium content rises very rapidly when the pH fails below a value of about 6.0.

TABLE II

| Bed Volumes | pH | Al* (ppm) | Si* (ppm) | Ca* (ppb) |
|---|---|---|---|---|
| Inlet | 2.16 | 5.16 | 11.1 | 17 |
| 7.43 | 8.35 | 0.5 | 7.7 | 17 |
| 22.13 | 7.58 | 0.35 | 8.6 | 37 |
| 31.93 | 6.59 | 0.26 | 8.0 | 68 |
| 44.98 | 5.98 | 0.11 | 7.8 | 270 |
| 58.78 | 5.85 | 0.18 | 7.8 | 510 |
| 67.78 | 5.65 | 0.19 | 8.0 | 650 |
| 81.72 | 5.48 | 0.19 | 7.9 | 690 |
| 95.37 | 5.33 | 0.30 | 8.2 | 680 |
| 114.87 | 4.78 | 0.74 | 8.7 | 540 |

*As measured by direct current plasma-atomic emission spectroscopy.

EXAMPLE 2

The resin of Example 1 was regenerated in-situ by backwashing the column with 500 ml of deionized water to remove any residual brine, acidifying the resin with 500 ml of 15% HCl solution in a downflow mode to remove the absorbed aluminum and silica, rinsing the acidified resin with 500 ml of deionized water in a downflow mode, converting the resin to the sodium form with 500 ml of 15% NaOH solution in an upflow made, rinsing with 500 ml of deionized water in a downflow mode and finally particle classificating the resin with a deionized water backflush.

The resin, so treated, was then used with a batch of a saturated brine solution having 18 ppb calcium, 5.42 ppm aluminum and 11.3 ppm silicon at a pH of 2.2. This solution was fed through the resin at a space velocity of about 8 bed volumes/hour.

After about 7½ hours (60 bed volumes) of operation, the column was shut down and allowed to stand overnight in static brine. The next day, a second saturated brine solution containing 80 ppb calcium, 7.2 ppm aluminum and 16.2 ppm silicon at a pH of 2.17 was processed through the bed at the same flow rate as used above for approximately 5 hours (40 bed volumes), after which the column was again shut down and allowed to stand overnight. On the third and fourth days, operation was continued for an additional 7½ hours (60 bed volumes) each day, before being shut down. Final results were taken on the fifth day after an additional 5 hours (262 bed volumes total) of operation.

Analysis of the results showed the resin to have absorbed 153.26 milliequivalents (meq) of aluminum and 124.89 meq of silica. Note that the total absorption capacity of the resin was considerably improved over that shown in Example 1. Further, note that the procedure described above consistently produced an effluent brine in which the total ionic/colloidal aluminum content was below the limits of detectability by emission spectroscopic analytical techniques. It is believed that for aluminum such a limit is in the vicinity of 10 ppb.

TABLE III

| Day | Bed Volumes | pH | Al* (ppm) | Si* (ppm) | Ca* (ppb) |
|---|---|---|---|---|---|
| 1 | Batch 1 | 2.2 | 5.42 | 11.3 | 18 |
|  | 4.12 | 8.10 | <0.1** | 6.9 | 33 |
|  | 9.11 | 8.07 | <0.1 | 8.8 | 20 |
|  | 27.56 | 7.95 | <0.1 | 9.5 | 50 |
|  | 43.94 | 7.92 | <0.1 | 9.6 | 22 |
|  | 58.69 | 7.88 | <0.1 | 9.5 | 17 |
|  | Batch 2 | 2.17 | 7.2 | 16.2 | 80 |
| 2 | 76.99 | 7.88 | <0.1 | 9.3 | 24 |
|  | 94.67 | 7.81 | <0.1 | 9.6 | 18 |
| 3 | 110.15 | 7.79 | <0.1 | 9.4 | 43 |
|  | 127.10 | 7.70 | <0.1 | 9.5 | 39 |
|  | 143.43 | 7.61 | <0.1 | 9.1 | 83 |
|  | 158.02 | 7.49 | <0.1 | 9.7 | 77 |
| 4 | 182.86 | 7.48 | <0.1 | 9.8 | 17 |
|  | 207.24 | 7.29 | <0.1 | 9.8 | 68 |
|  | 237.53 | 6.99 | <0.1 | 9.4 | 110 |
| 5 | 262.10 | 6.35 | <0.1 | 8.8 | 19 |
| AVERAGE |  |  | <0.1 | 9.2 ± 0.7 |  |

Average Bed Volumes/Hour = 8.16 ± 1.0
Note: ------ Indicates overnight column shut down.
*As measured by direct current plasma-atomic emission spectroscopy.
**Below limit of detectability.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In a process for purifying an alkali metal halide brine anolyte for an electrolytic cell, wherein the pH of said brine is raised so as to substantially remove dissolved calcium and magnesium therefrom, the improvement comprising:
   (a) adjusting the pH of said purified brine to between about 2.0 and about 3.0;
   (b) contacting said brine with a strong macroreticular cationic chelating resin to remove dissolved aluminum and silica therefrom, said contact causing the pH of said brine to increase and continuing the contacting of said brine with said resin for as long as the pH of the brine on discharge is above about 5.5; and
   (c) separating said brine from said resin for use in said cell.

2. The process of claim 1 further comprising readjusting, when necessary, the pH of said separated brine to the proper operating range for said cell.

3. The process of claim 1 wherein the pH of said discharged brine is above about 6.0.

4. The process of claim 1 wherein said purified brine is contacted with said resin in a batch reactor.

5. The process of claim 1 wherein said purified brine is contacted with said resin in a continuous flow.

6. The process of claim 5 wherein the space velocity of said brine is no more than about 35 bed volumes/hour.

7. The process of claim 6 wherein said space velocity is no more than about 10 bed volumes/hour.

8. The process of claim 1 wherein said alkali metal is sodium.

9. The process of claim 1 wherein said halide is chloride.

10. The process of claim 1 further comprising:
    (a) when the pH of said discharged brine falls below about 5.5, discontinuing the contacting of said brine with said resin;
    (b) washing said resin with a mineral acid to remove said dissolved aluminum and silica therefrom;
    (c) washing said acidified resin with a caustic solution so that it can absorb positive ions; and
    (d) returning to step (b) of claim 1.

11. A process for removing dissolved aluminum and silica from sodium chloride brines for use in an electrolytic cell comprising:
    (a) adjusting the pH of said brine to between about 2.0 and about 3.0;
    (b) contacting said brine with a strong macroreticular cationic chelating resin at a space velocity of no more than about 35 bed volumes/hour to remove dissolved aluminum and silica therefrom, said contact causing the pH of said brine to increase and continuing the contacting of said brine with said resin for as long as the pH of the brine on discharge is above about 6.0;
    (c) separating said brine from said resin; and
    (d) readjusting, when necessary, the pH of said discharged brine to the proper operating range for said cell.

12. The process of claim 11 wherein said space velocity is no more than about 10 bed volumes/hour.

13. A process for removing dissolved aluminum and silica from sodium chloride brines comprising:
    (a) adjusting the pH of said brine to between about 2.0 and about 3.0;
    (b) contacting said brine with a strong macroreticular cationic chelating resin at a space velocity of no more than about 30 bed volumes/hour to remove dissolved aluminum and silica therefrom, said contact causing the pH of said brine to increase and continuing the contacting of said brine with said resin for as long as the pH of the brine on discharge is above about 5.5;
    (c) separating said brine from said resin;
    (d) when the pH of said discharged brine falls below about 5.5, discontinuing the contacting of said brine with said resin;
    (e) washing said resin with a mineral acid to remove said dissolved aluminum and silica therefrom;
    (f) washing said acidified resin with a caustic solution so that it can absorb positive ions; and
    (g) returning to step (b).

14. The process of claim 13 wherein said space velocity is no more than about 10 bed volumes/hour.

* * * * *

UNITED STATES PATENT AND TRADEMARK OFFICE
CERTIFICATE OF CORRECTION

PATENT NO. : 4,450,057
DATED : May 22, 1984
INVENTOR(S) : Pilar P. Kelly

It is certified that error appears in the above-identified patent and that said Letters Patent is hereby corrected as shown below:

Column 1, line 21, after "reconstituted" delete "depicted" and insert --depleted--.

Column 3, line 5, delete "$SiO_3$--" and insert --$SiO_3^{=}$--.

Column 3, line 16, after "amino" delete "discetic" and insert --diacetic--.

Column 3, line 32, after "applied" delete "to" and insert --in--.

Column 4, line 24, after "pH" delete "fails" and insert --falls--.

Column 4, line 52, delete "made" and insert --mode--.

Signed and Sealed this

Ninth Day of October 1984

[SEAL]

Attest:

Attesting Officer

GERALD J. MOSSINGHOFF
Commissioner of Patents and Trademarks